United States Patent [19]

Uphoff

[11] Patent Number: 5,158,249
[45] Date of Patent: Oct. 27, 1992

[54] ORBITAL SYSTEMS FOR CISLUNAR TRAVEL

[75] Inventor: Chauncey Uphoff, Boulder, Colo.
[73] Assignee: Ball Corporation, Muncie, Ind.
[21] Appl. No.: 596,990
[22] Filed: Oct. 12, 1990
[51] Int. Cl.$^5$ .............................................. B64G 1/34
[52] U.S. Cl. ................................. 244/161; 244/158 R
[58] Field of Search ........................... 244/158 R, 161

[56] References Cited

U.S. PATENT DOCUMENTS 3,262,654  7/1966  Kaempen ........................... 244/161
4,370,769  8/1989  Draim ............................... 244/158 R

OTHER PUBLICATIONS

Uphoff, Roberts, and Friedman, "Orbital Design Concepts for Jupiter Orbiter Missions," 13 Journal of Spacecraft and Rockets (Jun., 1976).
Farquhar and Dunham, "A New Trajectory Concept for Exploring the Earth's Geomagnetic Tail," 4 Journal of Guidance and Control (Mar.–Apr., 1981).
Niehoff, "Gravity-Assisted Trajectories to Solar System Targets," 3 Journal of Spacecraft and Rockets (Sep., 1966).

*Primary Examiner*—Joseph F. Peters, Jr.
*Assistant Examiner*—Virna Lissi Mojica
*Attorney, Agent, or Firm*—Gilbert E. Alberding

[57] ABSTRACT

Orbital systems (28, 38) are provided which can be sustained with relatively low propellant requirements. The orbital systems (28, 38) comprise a plurality of earth-relative orbits, at least one of which is outside of the plane defined by the moon's earth-relative orbit (36). Transfers between the earth-relative orbits are achieved by using the moon's gravitational field. The orbital systems (28, 38) could be used to reduce the propellant requirements of lunar missions and could provide economic and life protecting advantages.

21 Claims, 3 Drawing Sheets

ORBITAL SYSTEMS FOR CISLUNAR TRAVEL

FIELD OF THE INVENTION

This invention relates in general to methods for space travel and in particular to methods for providing cislunar orbital systems which can be sustained using relatively little propellant.

BACKGROUND OF THE INVENTION

Since the first lunar missions in the 1960's, the world's space agencies have taken interest in the moon as an object of both scientific research and potential commercial development. During the 1980's, several lunar missions were launched by national space agencies and additional lunar missions are planned for the 1990's. In addition, the United States National Aeronautics and Space Administration has long been interested in establishing a lunar base to conduct scientific research and mining activities. Interest in the moon is likely to increase with the advent of the multi-national space station, scheduled for completion in the next decade, making it possible to stage lunar missions from low earth orbit. However, continued interest in the moon and the feasibility of a lunar base will depend, in part, on the agencies' ability to schedule frequent and economical lunar missions.

A typical lunar mission comprises the following steps. Initially, a spacecraft is launched from earth or low earth orbit and sufficient impulse per unit mass, or change in velocity, is provided to place the spacecraft into an earth-to-moon orbit. Generally, this orbit is a substantially elliptic earth-relative orbit having an apogee selected to nearly match the radius of the moon's earth-relative orbit. As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned. When a return trip to the earth is desired, another change in velocity is provided which is sufficient to insert the spacecraft into a moon-to-earth orbit, for example, an orbit similar to the earth-to-moon orbit. Finally, as the spacecraft approaches the earth, a change in velocity is required to transfer the spacecraft from the moon-to-earth orbit to a low earth orbit or an earth return trajectory.

The propellant required at each step above depends on the mass of the spacecraft and the change in velocity required. The spacecraft pays a mass penalty if unnecessary equipment is carried through any of the above steps. Conversely, for example, if the spacecraft could leave unnecessary equipment in orbit around the moon while a rendezvous vehicle touched down on the moon's surface, less maneuvering propellant would be required. Such unnecessary equipment might include earth re-entry shielding and elements of the spacecraft's cryogenics and extended life support systems. As can be understood, an even greater propellant savings would be achieved if such equipment was not transferred from the earth-to-moon orbit to a moon-relative orbit, or if the cryogenics, extended life support, and other systems could remain in orbit for use in future missions.

Accordingly, objectives of the present invention include the following.

Provision of a method for using the moon's gravitational field to return a spacecraft to earth.

Provision of an orbital system which allows a spacecraft to achieve line-of-sight contact with the lunar ecliptic poles with relatively low propellant requirements.

Provision of an orbital system which allows a moon-bound spacecraft to make at least two close lunar approaches and return towards the earth, all orbital transfers being achieved substantially by using the moon's gravitational field.

Provision of an orbital system which allows a spacecraft to make repeated close approaches to both the earth and moon, the system being sustainable with relatively low propellant requirements thereby providing an efficient method for cislunar travel.

Provision of an orbital system which does not require large propellant-supplied changes in velocity, thereby rendering practicable massive spacecraft components, such as solar radiation shielding.

Provision of frequent earth return possibilities from the moon with relatively few spacecraft.

Provision of an orbiting depot for equipment thereby allowing lunar missions to utilize rendezvous vehicles which maneuver efficiently.

Provision of an orbiting depot for equipment thereby allowing rendezvous vehicles to descend into the moon's gravity well with reduced vehicle mass.

Provision of a system for shuttling equipment, personnel, and supplies between the earth and moon.

Other objects and advantages of the present invention will be apparent upon consideration of the following summary and description of the invention.

SUMMARY OF THE INVENTION

The present invention disclosed herein comprises a method for cislunar travel which substantially reduces the propellant requirements for lunar missions. The present invention provides orbital systems useful for earth-to-moon and moon-to-earth travel which utilize the moon's gravitational field to achieve orbital transfers and can be sustained with relatively low propellant requirements. The present invention also provides frequent earth return possibilities for equipment and personnel on the moon or in a moon-relative orbit.

The present invention discloses orbital systems wherein the moon's gravitational field is used to achieve orbital transfers. The orbital systems comprise a first earth-relative orbit outside of the plane defined by the moon's earth-relative orbit wherein the spacecraft encounters the moon's sphere of gravitational influence; and a second earth-relative orbit which has an earth-relative energy per unit mass (hereinafter the term "energy" will be used in place of "energy per unit mass" as is conventional in orbital mechanics) substantially equal to or less than that of the first earth-relative orbit. The moon's gravitational field is used to transfer the spacecraft from the first earth-relative orbit to the second earth-relative orbit. Hereinafter, like terms will be used to identify analogously functioning orbits in the several embodiments.

In accordance with a first embodiment of the present invention, an orbital system is provided wherein the moon's gravitational field is used to reduce the spacecraft's earth-relative energy and effect an orbital transfer. First, the spacecraft is introduced into a first earth-relative orbit, outside of the plane defined by the moon's earth-relative orbit, wherein the spacecraft encounters the moon's sphere of gravitational influence, generally taken to be about 50,000-60,000 kilometers in radius. For example, a spacecraft in an earth-to-moon orbit could be introduced into the first earth-relative orbit by using the moon's gravitational field to increase the spacecraft's earth-relative energy. The first earth-relative orbit could comprise, for example, one-half revolution of a one lunar month earth-relative orbit, inclined about 30°-60° relative to the plane defined by the moon's earth-relative orbit, which originates and terminates within the moon's sphere of gravitational influence.

Second, the spacecraft uses the moon's gravitational field to transfer from the first earth-relative orbit to the second earth-relative orbit. The second earth-relative orbit may be used to return to the earth or may be selected so that it is resonant with the moon's earth-relative orbit. To return to earth, the second earth-relative orbit may be selected so that it comprises a moon-to-earth orbit similar to the earth-to-moon orbit above. As used herein, the term "resonant" denotes orbits wherein orbiting objects which pass near to each other will again pass near to each other on subsequent periodic occasions. In the first embodiment, selecting the second earth-relative orbit so that it is resonant with the moon's earth-relative orbit allows the spacecraft to re-enter the moon's sphere of gravitational influence, whereupon the spacecraft can repeat the above orbital sequence. As will be clarified in the Detailed Description, the shape of the second earth-relative orbit will be affected by the lunar swingby conditions including the incoming velocity of the spacecraft, the perilunar swingby radius, and the path which the spacecraft traces over the lunar surface. Thus, the method of selecting the second earth-relative orbit will be by providing a relatively small change in velocity during the first earth-relative orbit thereby determining the lunar swingby conditions. The first earth-relative orbit and second earth-relative orbit may be selected so that they have substantially the same Jacobian constant thereby allowing transfer therebetween to be achieved by using the moon's gravitational field. As is known, the Jacobian constant, which is obtained by applying the Jacobian integral with respect to a given set of orbital parameter values, must remain substantially constant for any one lunar swingby.

In accordance with a second embodiment of the invention, an orbital system is provided which allows a spacecraft to make repeated close approaches to both the earth and moon with relatively low propellant requirements, wherein the moon's gravitational field is used to effect orbital transfers while approximately maintaining or reducing the spacecraft's earth-relative energy. First, the spacecraft is introduced into a first earth-relative orbit, outside of the plane defined by the moon's earth-relative orbit, wherein the spacecraft encounters the moon's sphere of gravitational influence. For example, the first earth-relative orbit could comprise one-half revolution of a one lunar month earth-relative orbit which originates and terminates within the moon's sphere of gravitational influence.

Second, the spacecraft uses the moon's gravitational field to transfer from the first earth-relative orbit to a third earth-relative orbit which originates and terminates within the moon's sphere of gravitational influence, while approximately maintaining the spacecraft's earth-relative energy. The third earth-relative orbit could comprise, for example, one revolution of a one lunar month earth-relative orbit. The first earth-relative orbit and the third earth-relative orbit may be chosen so that the orbits' eccentricities and inclinations, relative to the plane defined by the moon's earth-relative orbit, are sufficiently different that an encounter with the moon's sphere of gravitational influence is necessary to effect a transfer therebetween without substantial use of propellant. The spacecraft can then use subsequent encounters with the moon's sphere of gravitational influence to cyclically alternate between orbits similar to the first earth-relative orbit of the second embodiment (i.e. orbits which are inclined relative to the plane defined by the moon's earth-relative orbit and which will encounter the moon's sphere of gravitational influence) and orbits similar to the third earth-relative orbit of the second embodiment (i.e. orbits which originate and terminate within the moon's sphere of gravitational influence). Preferably, the orbits similar to the first earth-relative orbit will comprise substantially one-half revolution of a one-lunar month earth-relative orbit. Similarly, the orbits similar to the third earth-relative orbit will preferably comprise substantially one revolution of a one-lunar month earth-relative orbit.

Third, the spacecraft uses the moon's gravitational field to reduce the spacecraft's earth-relative energy and transfer to a second earth-relative orbit. The second earth-relative orbit comprises, for example, an orbit which is resonant with the moon's earth-relative orbit so that the spacecraft re-enters the moon's sphere of gravitational influence. The spacecraft can thereby use the moon's gravitational field to transfer from the second earth-relative orbit into an orbit similar to the first earth-relative orbit and into an alternating cycle as described above. Preferably, but not essentially, the second earth-relative orbit has a perigee within about one or two earth radii of the earth's surface, thereby allowing an economical rendezvous between the spacecraft and an earth-to-spacecraft vehicle. The first, second, and third earth-relative orbits may be selected so that they have substantially the same Jacobian constant thereby allowing the above transfers to be made by using the moon's gravitational field. The moon's sphere of gravitational influence is used to achieve the above transfers by targeting, through relatively small midorbit changes in velocity, for lunar swingby conditions which yield the desired orbit.

In accordance with a third embodiment of the present invention a second spacecraft is added to the orbital system of the second embodiment, wherein the moon's gravitational field is used to effect orbital transfers while approximately maintaining or reducing the spacecraft's earth-relative energy, to provide twice monthly earth return possibilities. Each spacecraft alternates between orbits similar to the first and third earth-relative orbits of the second embodiment, said first and third orbits having approximately the same earth-relative energy, until an earth return is desired. The spacecraft then uses the moon's gravitational field to reduce the spacecraft's earth-relative energy and transfer to an orbit similar to the second earth-relative orbit of the second embodiment (i.e. an orbit which is resonant with the moon's earth-relative orbit so that the orbital sequence can be repeated when the spacecraft subsequently encounters the moon's sphere of gravitational influence). Preferably, the orbit similar to the second earth-relative orbit will have a perigee within about two earth radii of the earth's surface, thereby allowing an economical rendezvous between the spacecraft and an earth-to-spacecraft vehicle. This orbit can thus be used to shuttle personnel and equipment from the moon to earth. To provide regular twice monthly earth return possibilities, with only two spacecraft, the spacecrafts' orbits are arranged so that one spacecraft begins an orbit similar to the first earth-relative orbit substantially as the other spacecraft begins an orbit similar to the third earth-relative orbit.

It is a technical advantage of the present invention that a method of cislunar travel is provided which substantially reduces the propellant requirements for cislunar missions. It is a further technical advantage of the present invention that orbital systems are provided which allow spacecraft to make repeated and frequent close approaches to both the earth and moon and which can be sustained with relatively low propellant requirements.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE DRAWINGS

Figure 1:
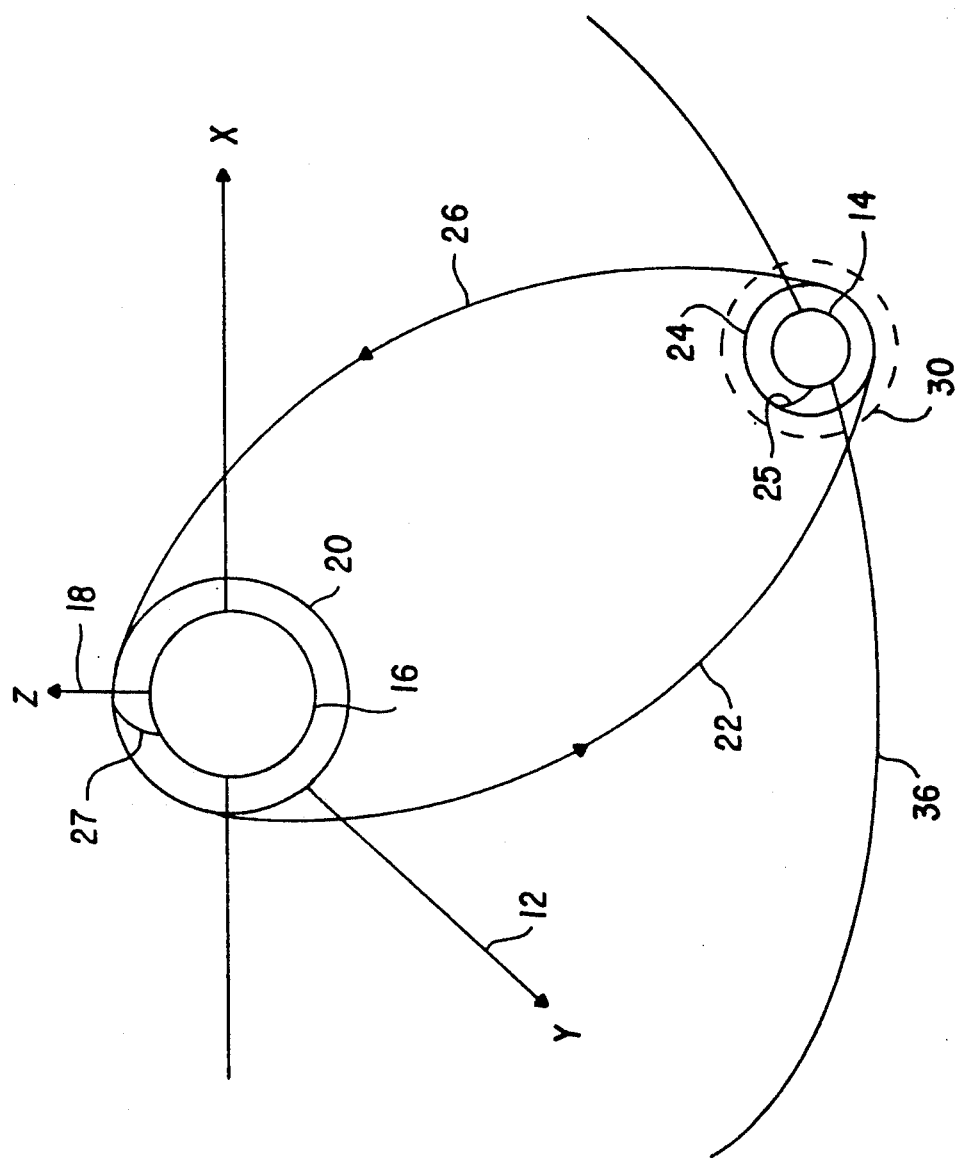
FIG. 1 is an isometric view of an orbital system in accordance with a prior art lunar mission.
Figure 2:
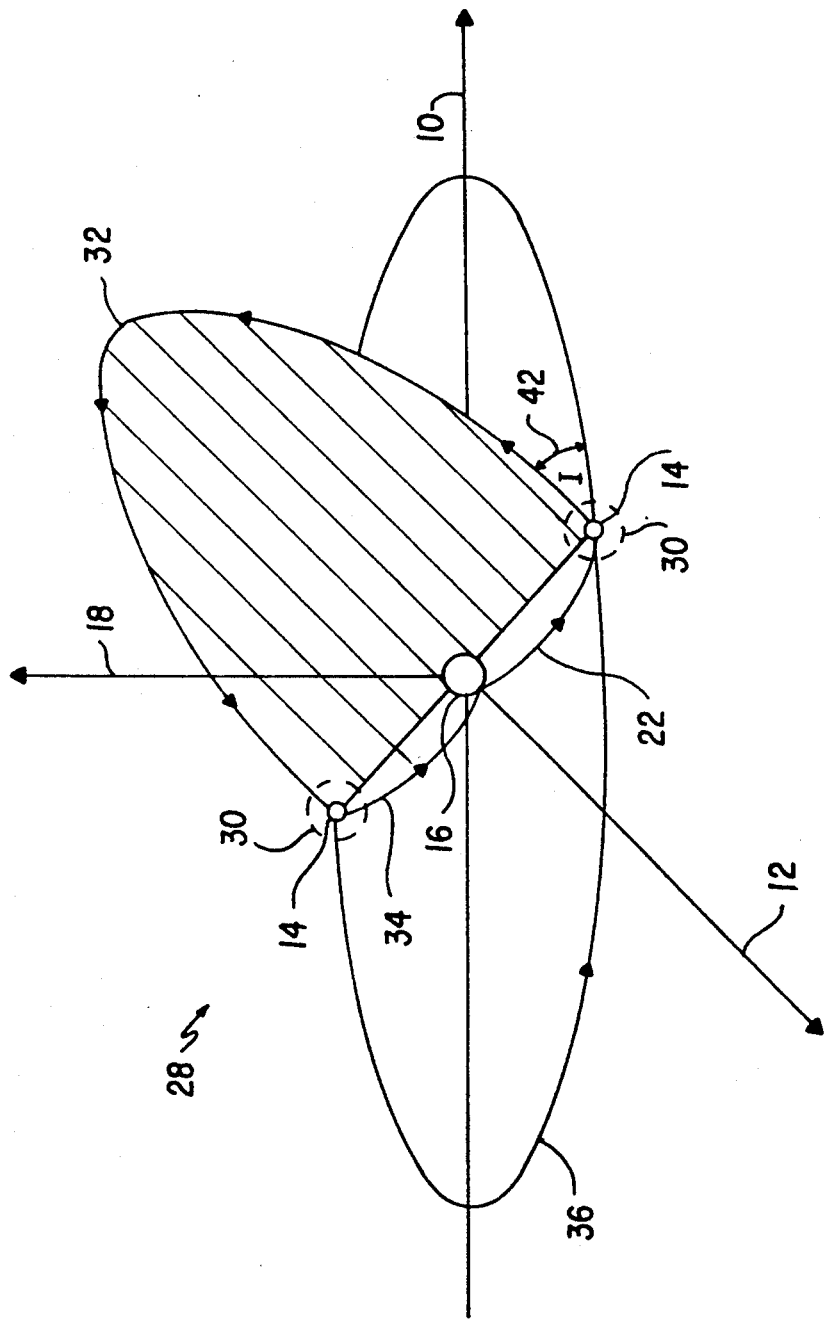
FIG. 2 is an isometric view of an orbital system in accordance with an embodiment of the present invention.
Figure 3:
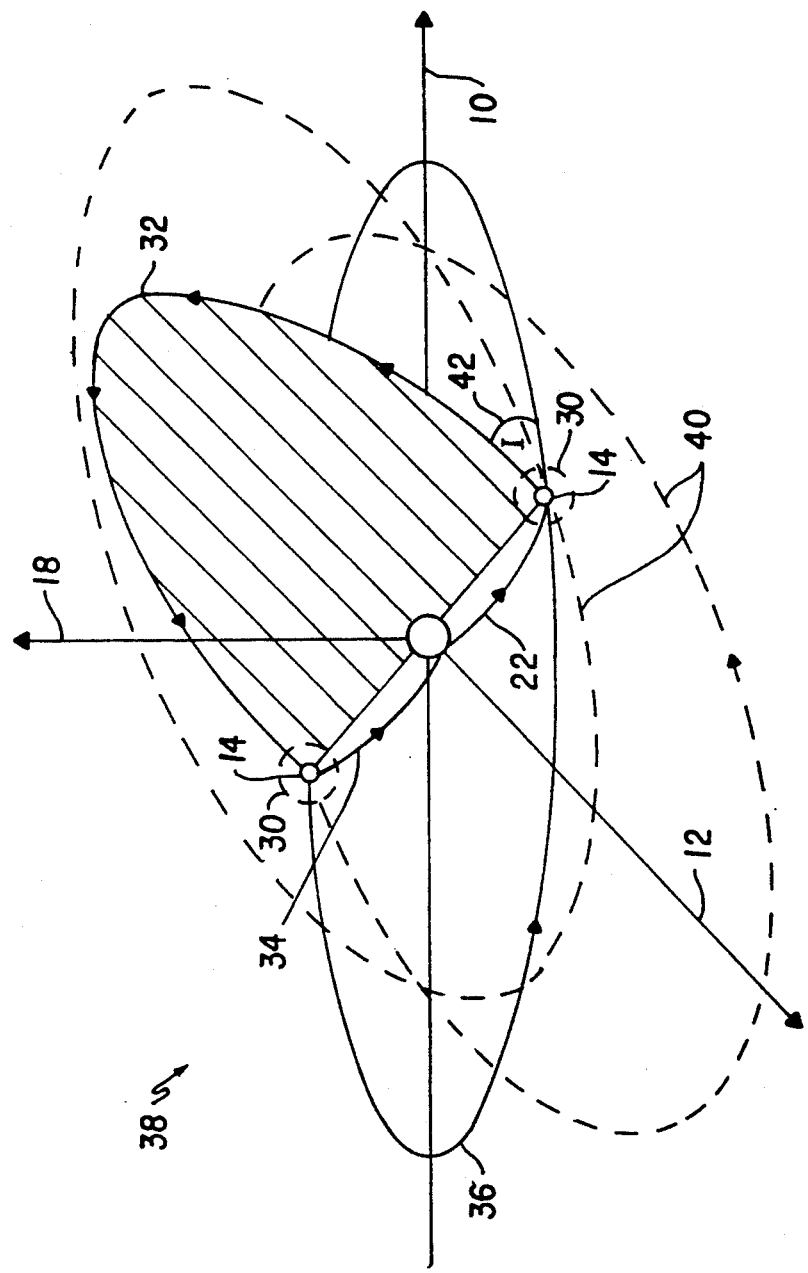
FIG. 3 is an isometric view of orbital systems in accordance with further embodiments of the present invention.

In FIGS. 1-3 like items and analogously functioning orbits are identified by like and corresponding numerals for ease of reference. Referring first to FIG. 1, an orbital system in accordance with a prior art lunar mission is illustrated in a non-rotating coordinate system wherein the X-axis 10 and Y-axis 12 lay in the plane defined by the moon's earth-relative orbit 36, and the Z-axis 18 is normal thereto. In a typical prior art lunar mission a spacecraft is launched from earth 16 or low earth orbit 20, not necessarily circular, and provided with sufficient velocity to place the spacecraft into an earth-to-moon orbit 22. Near the moon 14, a change in velocity is provided to reduce the spacecraft's moon-relative energy and transfer the spacecraft into a moon-relative orbit 24 which is not necessarily circular. An additional change in velocity is then provided to transfer the spacecraft from the moon-relative orbit 24 to the moon 14 by way of the moon landing trajectory 25. When an earth-return is desired, a change in velocity sufficient to place the spacecraft into a moon-to-earth orbit 26 is provided either directly from the moon's surface or through multiple impulses as in the descent. Finally, near the earth 16 a change in velocity is provided to reduce the spacecraft's earth-relative energy and return the spacecraft to low earth orbit 20 or to earth 16 via the earth-return trajectory 27.

The propellant required at each step above depends on the mass of the spacecraft and the change of velocity required to effect the orbital transfer. The change in velocity at each step is generally provided by burning propellant. A mass of propellant is thereby expelled from the spacecraft at a large spacecraft-relative velocity and the remaining spacecraft mass changes velocity reactively. As a practical matter, because the orbital transfers in prior art lunar missions are achieved by burning propellant, the number and magnitude of orbital transfers which can be performed in a lunar mission are highly sensitive to the mass of the spacecraft.

The present invention uses the moon's gravitational field to achieve orbital transfers. In particular, the present invention provides orbital systems which utilize the moon's gravitational field to transfer from an earth-relative orbit outside of the plane defined by the moon's earth-relative orbit 36 to an earth-relative orbit having approximately the same or lower earth-relative energy. As is known, orbital transfers may be modeled with the aid of the Jacobi integral. In a circular restricted three body scenario, the Jacobi integral can be expressed in the illustrated coordinate system as:

$$C = E - n'h_z$$

where E represents the earth-relative energy of the spacecraft, n' is the mean motion of the moon, and $h_z$ is the component of spacecraft angular momentum normal to the plane defined by the moon's earth-relative orbit 36. Furthermore, in any one lunar swingby, the value of the Jacobian constant C must remain substantially constant. Thus, in any one swingby, $$\Delta E = n'\Delta h_z$$

This means that the change in earth-relative energy caused by the moon's gravitational field during a swingby is accompanied by a change in the component of angular momentum per unit mass normal to the plane defined by the moon's earth-relative orbit 36.

In the above analysis, the spacecraft is assumed to be at any point in its earth-relative orbit where the moon's influence on the spacecraft is insignificant relative to the earth's influence. It is important to note that over a series of lunar swingbys the Jacobian constant may vary slightly because the moon's earth-relative orbit is not precisely circular but rather has an eccentricity of 0.055.

In practice, a lunar swingby can be designed through a process of patched conic selection and numerical integration verification. In the patched conic selection step, the analysis is confined to orbital parameters well before and well after the spacecraft passes through the moon's sphere of gravitational influence 30. For example, a pre-swingby orbit and a post-swingby orbit can be selected so that they have substantially the same Jacobian constant thus indicating that the transfer can be made by using the moon's gravitational field. In the numerical integration step, the actual swingby conditions are calculated, by known integration techniques such as Cowell's method, Enche's method, or, approximately by two-body methods, to determine if the transfer is feasible.

Referring to FIG. 2, an orbital system in accordance with an embodiment of the present invention is generally identified by the reference numeral 28. The orbital system 28 comprises a plurality of earth-relative orbits, transfer therebetween accomplished by using the moon's gravitational field. The moon's gravitation field is used by targeting, through relatively small mid-orbit changes in velocity, for lunar swingby conditions which yield the desired orbit. Although the earth-relative orbits in the orbital system 28 may be selected so that they all have the same Jacobian constant, thus indicating that the transfers therebetween can be achieved with no propellant-supplied change in velocity in the nominal case, relatively small propellant-supplied changes in velocity may be required. Propellant-supplied changes in velocity may be required to correct for targeting errors at previous lunar swingbys, to choose between alternative orbits achievable at a given swingby, and to account for changes in Jacobian constant due to the eccentricity of the moon's earth-relative orbit 36. However, it is anticipated that the propellant-supplied changes in velocity required during any orbit will be less than 10 meters per second.

In the illustrated embodiment, a spacecraft is launched from earth 16 or low earth orbit into an earth-to-moon orbit 22. The earth-to-moon orbit 22 may comprise, for example, a near minimal energy earth-to-moon trajectory, that is, an orbit having an apogee distance that nearly matches the moon's earth-relative orbit 36 radius. The spacecraft encounters the moon's sphere of gravitational influence 30 and uses the moon's gravitational field to transfer to a first earth-relative orbit 32. The first earth-relative orbit 32 comprises, for example, approximately one-half revolution of a substantially one lunar month near circular orbit which has a semi-major axis and eccentricity substantially the same as the moon's earth-relative orbit 36, which is inclined approximately 46.3. relative to the plane defined by the moon's earth-relative orbit 36, and which originates and terminates within the moon's sphere of influence 30. Because the first earth-relative orbit 32 and a typical near minimum energy, earth-to-moon orbit 22 have the same Jacobian constant, the transfer can be accomplished by using the moon's gravitational field.

Although the first earth-relative orbit 32 has been described with respect to a particular embodiment thereof, it is to be understood that different orbital parameters may be employed. For example, by passing near the moon's ecliptic poles, it is possible to use the moon's gravitational field to transfer from a near minimal energy earth-to-moon orbit 22 to an earth-relative orbit which is inclined nearly 60° relative to the plane defined by the moon's earth-relative orbit. However, in order for the 60° orbit to return to the moon's sphere of gravitational influence 30 after one-half revolution, either a higher energy earth-to-moon orbit 22 must be utilized, or some change in velocity will be required during the 60° orbit so that its energy nearly matches the energy of the moon's earth-relative orbit 36. Conversely, if the inclination of the first earth-relative orbit 32 is less than about 30° relative to the plane defined by the moon's earth-relative orbit 36, the moon's perturbation of the first earth-relative orbit 32 becomes significant thereby complicating but not precluding the orbital design. As will be understood by those skilled in the art, the orbit achieved will depend upon the earth-to-moon orbit 22 and lunar swingby conditions, such as the perilune swingby radius and path which the spacecraft traces over the lunar surface. Numerical integration has verified that the perilunar swingby radius that effects the above transfer is approximately 4,850 kilometers when the moon is encountered at the perigee of its earth-relative orbit 36, comfortably above the lunar surface at 1,738 kilometers.

The spacecraft uses another encounter with the moon's sphere of gravitational influence 30 to reduce the spacecraft's earth-relative energy and transfer from the first earth-relative orbit 32 to a second earth-relative orbit 34. The second earth-relative orbit 34 comprises, for example, a moon-to-earth orbit similar to the earth-to-moon orbit 22. The second earth-relative orbit 34 could alternatively be selected so that it is resonant with the moon's earth-relative orbit 36, that is, so that the spacecraft will return to the moon's sphere of gravitational influence 30 if no further orbital maneuvers are performed. For example, the period of the second earth-relative orbit 34 might be one-half or one-third of a lunar month so that the spacecraft completes two or three revolutions while the moon completes one; or the period of the second earth-relative orbit 34 might be two-fifths of a lunar month so that the spacecraft completes five revolutions while the moon completes two. Preferably, but not essentially, the second earth-relative orbit 34 has a perigee within about one or two earth radii of the earth's surface, thereby allowing an economical rendezvous between the spacecraft and an earth-to-spacecraft vehicle.

The period and energy of an orbit depend on the length of the orbit's major axis. As can be understood, the earth-relative energy and Jacobian constant of the second earth-relative orbit 34 will vary with the period, inclination and eccentricity of that orbit. Thus, the inclination I 42 and, consequently, the Jacobian constant of the first earth-relative orbit 32 will have to be selected accordingly to minimize the propellant requirement of the transfer from the first earth-relative orbit 32 to the second earth-relative orbit 34. Given a near-circular first earth-relative orbit 32, it is anticipated that there will be a particular inclination I 42 thereof, and resulting Jacobian constant, roughly corresponding to each resonant second earth-relative orbit 34. More accurately, it is anticipated that there will be a band of first earth-relative orbit 32 inclinations corresponding to each resonant second earth-relative orbit 34, the width of the band resulting from the eccentricity of the moon's earth-relative orbit 36, variation of the orbital parameters of the first earth-relative orbit 32 and second earth-relative orbit 34, and other factors.

The advantage of selecting the second earth-relative orbit 34 so that it is resonant with the moon's earth-relative orbit 36 is that the entire orbital system 28 may then be repeated with the second earth-relative orbit 34 functioning as the earth-to-moon orbit 22 did originally. Since the first earth-relative orbit 32 and the second earth-relative orbit 34 have been selected so that they have substantially the same Jacobian constant, the spacecraft can alternate between the orbits with relatively low propellant requirements, thereby allowing the orbital system 28 to be sustained for long periods of time. If the spacecraft is adapted to rendezvous with other space vehicles, the spacecraft may thus effectively serve as a space depot for massive equipment and as a shuttle for equipment and personnel during lunar missions.

In practice, this embodiment of the present invention might be applied as follows. A spacecraft including integral cryogenics, extended life support systems, and radiation shielding could use the moon's gravitational field to alternate between orbits such as the first earth-relative orbit 32 and second earth-relative orbit 34. When a lunar mission is planned, a second vehicle can be launched from earth 16 or low earth orbit 20 to rendezvous with the spacecraft as it passes near earth 16. The spacecraft can then serve as host during the earth-to-moon trip and be used to store equipment not needed during the lunar descent. When the spacecraft passes near the moon 14, the second vehicle can be detached therefrom and maneuver to the lunar surface. A similar process can be employed for the return trip.

Alternatively, the second vehicle could remain with the spacecraft while a third vehicle descended to the lunar surface. This configuration would have a number of advantages. First, it would allow servicing of the second vehicle by spacecraft personnel or equipment during the lunar mission. Second, it would allow the use of different vehicles, each of which could be tailored for its assignment. For example, only the second vehicle would need to have shielding sufficient for re-entry to the earth's atmosphere.

It is to be understood that many other applications of this embodiment will be suggested to those skilled in the art. For example, this embodiment might simply be used to return moon-bound spacecraft to the earth 16. This can be accomplished by using the moon's sphere of gravitational influence 30 to transfer to the first earth-relative orbit 32 and using the moon's sphere of gravitational influence 30 again to transfer to the second earth-relative orbit 34. The second earth-relative orbit 34 can then be used to return to earth 16.

Referring to FIG. 3, an orbital system in accordance with a further embodiment of the present invention is illustrated. The moon's gravitational field is used to transfer from an earth-to-moon orbit 22 to a first earth-relative orbit 32. The first earth-relative orbit 32 comprises, for example, substantially one-half revolution of a substantially one lunar month earth-relative orbit which is inclined an angle I 42 relative to the plane defined by the moon's earth-relative orbit 36 and which originates and terminates within the moon's sphere of gravitational influence 30. Preferably, the first earth-relative orbit 32 will have an eccentricity and major axis similar to the moon's earth-relative orbit 36 so that the orbit 32 may terminate within the moon's sphere of gravitational influence 30 substantially without any propellant supplied change of velocity.

The spacecraft uses the moon's gravitational field at the subsequent encounter with the moon's sphere of gravitational influence 30 to transfer from the first earth-relative orbit 32 to a third earth-relative orbit 40 having an earth-relative energy approximately equal to that of the first earth-relative orbit. The third earth-relative orbit 40 comprises, for example, substantially one-revolution of a substantially one lunar month earth-relative orbit having a Jacobian constant approximately equal to that of the first earth-relative orbit 32. The third earth-relative orbit 40 may be selected such that its inclination I 42 and eccentricity are sufficiently different from the first earth-relative orbit 32 that a close lunar approach is necessary to effect a transfer therebetween by using the moon's gravitational field. Because the period of the third earth-relative orbit 40 is substantially equal to the period of the moon's earth-relative orbit 36 in the illustrated embodiment, the spacecraft will re-enter the moon's sphere of gravitational influence 30 at the completion of the third earth-relative orbit 40.

The spacecraft may then use the moon's gravitational field to transfer into an orbit similar to the first earth-relative orbit 32. In this configuration, the spacecraft can alternate between orbits similar to the third earth-relative orbit 40 and orbits similar to the first earth-relative orbit 32 for long periods of time. Each orbit may be selected so that it has substantially the same Jacobian constant as the immediately preceding orbit thereby allowing transfer therebetween to be effected by using the moon's gravitational field.

At any lunar approach of this alternating cycle, the spacecraft can use the moon's gravitational field to transfer to a second earth-relative orbit 34 which is resonant with the moon's earth-relative orbit 36. Since the second earth-relative orbit 34 is resonant with the moon's earth-relative orbit 36, the moon's gravitational field can be utilized, at the subsequent encounter with the moon's sphere of gravitational influence 30, to transfer from the second earth-relative orbit 34 to an orbit similar to the first earth-relative orbit 32 and the sequence of orbits can be repeated.

In another embodiment of the present invention, the addition of a second spacecraft allows for twice monthly opportunities to transfer to the second earth-relative orbit 34. This system is implemented as follows. The moon's gravitational field is used to transfer from a first earth-relative orbit, which is inclined relative to the plane defined by the moon's earth-relative orbit, to a third earth-relative orbit having an earth-relative energy approximately equal to that of the first earth-relative orbit. Each spacecraft then alternates between orbits similar to the third earth-relative orbit 40 and orbits similar to the first earth-relative orbit 32. The spacecraft are arranged so that substantially every 1.5 lunar months the two spacecraft approach the moon 14 at substantially the same time. One spacecraft then begins an orbit similar to the first earth-relative orbit 32 while the other begins an orbit similar to the third earth-relative orbit 40. This embodiment, in combination with vehicles which transfer personnel and equipment between the spacecraft and the moon 14 and between the spacecraft and earth 16, provides twice monthly earth 16 return possibilities. It is to be understood that the second earth-relative orbit 34 could be used to return the spacecraft itself to earth 16 or that the third earth-relative orbit 40 could be inserted after the first earth-relative orbit 32 in the embodiment illustrated in FIG. 2.

Further advantages of the orbital systems 28, 38 will be suggested to one skilled in the art. For example, because spacecraft can be sustained in the orbital systems 28, 38 with little propellant-supplied change in velocity, the systems 28, 38 render practicable massive spacecraft components such as radiation shielding, cryogenic propellant storage and medical facilities. Currently, persons in space are vulnerable to radiation due to solar activity because the shielding which would be required to afford protection is so massive as to be impracticable for spacecraft which must provide significant propellant-supplied changes in velocity. In addition, the orbital systems 28, 38 provide a practical means to achieve line-of-sight contact with the lunar ecliptic poles, a capability of significant scientific value. Moreover, as spacecraft are added to the orbiting systems 28, 38, the spacecraft may be linked together, thereby providing a practical means for constructing a large orbiting space facility.

Although the present invention has been described with respect to specific embodiments thereof, various changes and modifications, in addition to those cited above, may be suggested to one skilled in the art and it is intended that the present invention encompass such changes and modifications as fall within the scope of the appended claims.

What is claimed is:

1. A method of space travel comprising the steps of:

introducing a spacecraft which is positioned within the moon's sphere of gravitational influence into a first earth-relative orbit in a plane transverse to the plane of the moon's earth-relative orbit, wherein the spacecraft leaves and then enters the moon's sphere of gravitational influence; and using the moon's gravitational field to transfer from said first earth-relative orbit to a second earth-relative orbit in a plane transverse to said plane of said first orbit which has an earth-relative energy approximately the same or less than that of said first earth-relative orbit.

2. A method of space travel, comprising the steps of:

introducing a spacecraft which is positioned within the moon's sphere of gravitational influence into a first earth-relative orbit in a plane transverse to the plane of the moon's earth-relative orbit, wherein the spacecraft leaves and then enters the moon's sphere of gravitational influence; and using the moon's gravitational field to reduce the said spacecraft's earth-relative energy and transfer from said first earth-relative orbit to a second earth-relative orbit in a plane transverse to said plane of said first orbit which is resonant with the moon's earth-relative orbit.

3. The method of claim 1, wherein said spacecraft is launched from earth or low earth orbit on a near minimal energy earth-to-moon orbit; and using said moon's gravitational field to transfer said spacecraft into said first earth-relative orbit.

4. The method of claim 3, wherein said craft remains in said first earth-relative orbit for approximately one-half lunar month.

5. The method of claim 1, wherein said first earth-relative orbit and said second earth-relative orbit have substantially the same Jacobian constant.

6. The method of claim 5, wherein said second earth-relative orbit is resonant with the moon's earth-relative orbit.

7. The method of claim 6, wherein the angle between the plane defined by said first earth-relative orbit and the plane defined by the moon's earth-relative orbit is approximately 30°-60°.

8. The method of claim 2 wherein said second earth-relative orbit has a perigee within about two earth radii of the earth's surface.

9. The method of claim 2, wherein said first earth-relative orbit and said second earth-relative orbit have substantially the same Jacobian constant.

10. The method of claim 2, comprising the step of:
using the moon's gravitational field to transfer from said second earth-relative orbit into an earth-relative orbit outside of the plane defined by the moon's earth-relative orbit, wherein said spacecraft leaves and then enters the moon's sphere of gravitational influence.

11. The method of claim 2, comprising the step of:
alternating between earth-relative orbits outside of the plane defined by the moon's earth-relative orbit wherein said spacecraft leaves and then enters the moon's sphere of gravitational influence, and earth-relative orbits which are resonant with the moon's earth-relative orbit.

12. The method of claim 11, wherein at least one of said earth-relative orbits outside of the plane defined by the moon's earth-relative orbit, and at least one of said earth-relative orbits which are resonant with the moon's earth-relative orbit, have substantially the same Jacobian constant.

13. The method of claim 12 wherein said steps of using the moon's gravitational field comprise:
targeting for lunar swingby conditions which yield the desired orbit with minimal propellant requirements.

14. The method of claim 13, wherein said spacecraft remains in said first earth-relative orbit for approximately one-half lunar month.

15. The method of claim 14, comprising the step of:
using the moon's gravitational field to transfer to an orbit comprising substantially one revolution of a substantially one lunar month earth-relative orbit wherein said spacecraft leaves and then enters the moon's sphere of gravitational influence.

16. A method for space travel, comprising the steps of:
(a) using the moon's gravitational field to transfer a spacecraft which is positioned within the moon's sphere of gravitational influence to a first orbit comprising substantially onehalf revolution of a substantially one lunar month earth relative orbit in a plane transverse to the plane of the moon's earth-relative orbit, wherein the spacecraft leaves and then enters the moon's sphere of gravitational influence;

(b) using the moon's gravitational field to transfer said spacecraft to a second orbit comprising substantially one revolution of a substantially one lunar month earth-relative orbit in a plane transverse to said plane of said first orbit wherein said spacecraft leaves and then enters the moon's sphere of gravitational influence; and (c) using the moon's gravitational field to reduce the earth-relative energy of said spacecraft and transfer to a third earth-relative orbit which is resonant with the moon's earth-relative orbit and has a perigee within about two earth radii of the earth's surface.

17. The method of claim 16, comprising the step of:
alternating between steps (a) and (b) at subsequent encounters with the moon's sphere of gravitational influence.

18. The method of claim 17, comprising the step of:
adding a second spacecraft that also performs said step of alternating, wherein one of the spacecraft performs step (a) substantially as the other spacecraft performs step (b) so that at least one of the spacecraft encounters the moon's sphere of gravitational influence at approximately one-half lunar monthly intervals.

19. The method of claim 18, wherein an orbit achieved through step (a), an orbit achieved through step (b), and an orbit achieved through step (c) have substantially the same Jacobian constant.

20. The method of claim 19, wherein the eccentricity and orbital inclination, relative to the plane defined by the moon's earth-relative orbit, of an orbit achieved through step (a) are sufficiently different from that of an orbit achieved through step (b) that a close lunar approach is necessary to effect a transfer therebetween with minimal propellant requirement.

21. The method of claim 16, further comprising the step of:
interconnecting said spacecraft with another spacecraft.

* * * * *